2 Sheets—Sheet 1.

H. H. BRIDENTHALL, Jr.
GRAIN BINDER.

No. 177,990. Patented May 30, 1876.

Witnesses.
P. McGuire
J. McGuire

Inventor.
Harry H. Bridenthall Jr.

N. PETERS, PHOTO-LITHOGRAPHER, WASHINGTON, D. C.

2 Sheets—Sheet 2.

H. H. BRIDENTHALL, Jr.
GRAIN BINDER.

No. 177,990. Patented May 30, 1876.

Witnesses
P. McGuire
J. McGuire

Inventor
Harry H. Bridenthall Jr.

N. PETERS, PHOTO-LITHOGRAPHER, WASHINGTON, D. C.

UNITED STATES PATENT OFFICE.

HARRY H. BRIDENTHALL, JR., OF WESTMORELAND COUNTY, PENNSYLVANIA.

IMPROVEMENT IN GRAIN-BINDERS.

Specification forming part of Letters Patent No. 177,990, dated May 30, 1876; application filed October 1, 1875.

*To all whom it may concern:*

Be it known that I, HARRY H. BRIDENTHALL, Jr., of the county of Westmoreland and State of Pennsylvania, have invented certain new and useful Improvements in Grain-Binders; and I do hereby declare the following to be a clear and exact description of the same, reference being had to the drawings forming a part of this specification, in which—

Figure 1:
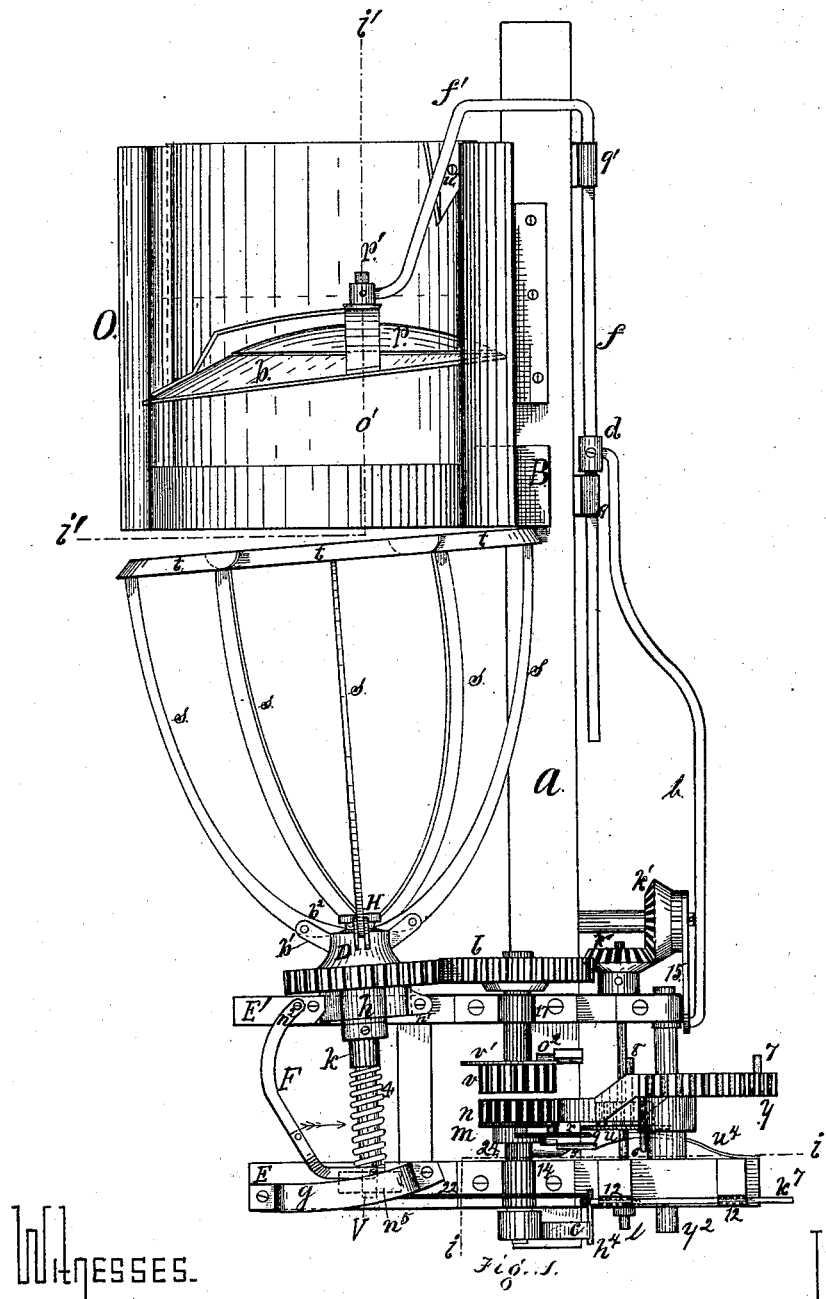
Figure 2:
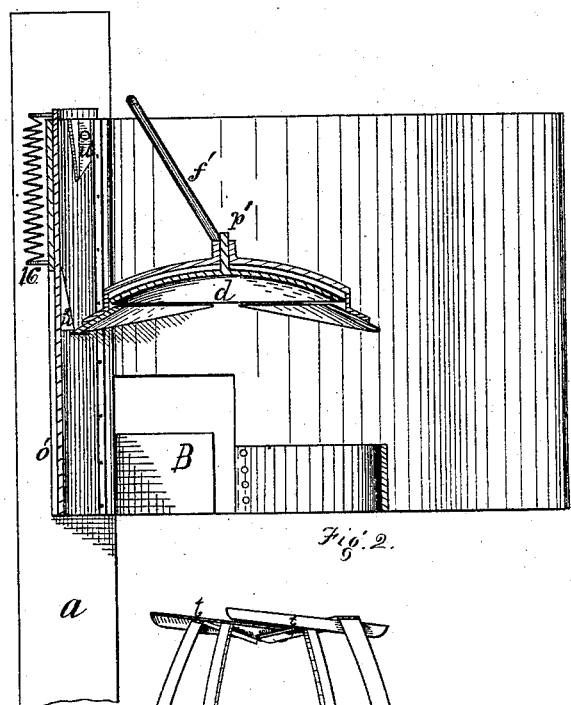
Figure 3:
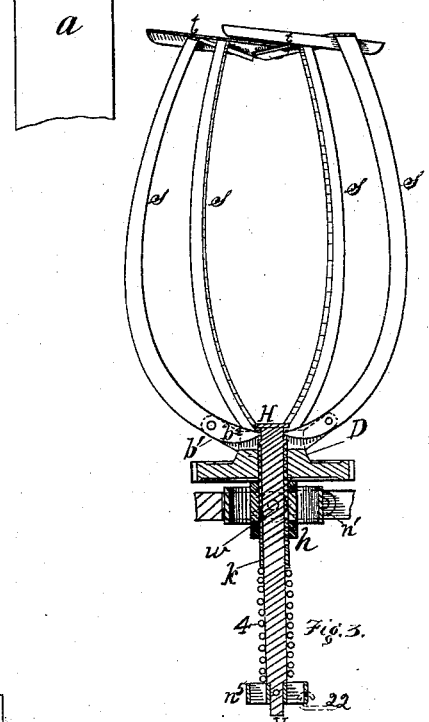
Figure 5:
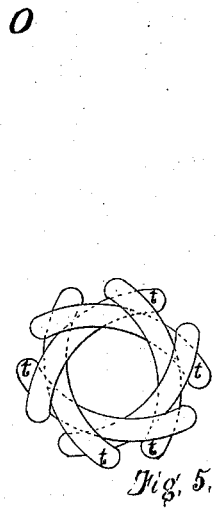
Figure 4:
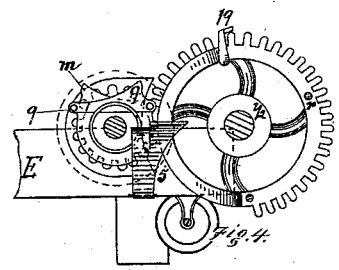

Figure 1 represents a top view of my machine, shown in a position as about to discharge a bound sheaf. Fig. 2 is a vertical sectional elevation of the recovering-cylinder, taken through the line $i'\ i'$, showing the butting-piston and discharging-door. Fig. 3 is a top sectional view of the mechanism which operates the compressing-ring. Fig. 4 is vertical sectional view of the driving-gear, taken through the line $i\ i$, and showing the staggered segmental driving-wheel, with its scalloped disk-pinions and retaining-latches; and Fig. 5 is a front elevation of the compressing-ring closed, showing the arrangement of the segmental grasping-jaws.

Similar letters and numbers of reference, where they occur in different figures, refer to like parts of the machine in all of the drawings.

My invention relates to that class of grain-binders which form a band of the straws of the gavel to be bound, and wherein the gavel is rotated while the band is being formed thereon; and my invention has for its objects to furnish new and effective devices whereby the gavel is automatically brought to a suitable shape, held and rotated until bound, and then discharged.

It consists in a compressing-ring composed of a series of overlapping segmental clamping-jaws, pivoted to a swinging revolving head; in a revolving reciprocating butting-disk, whereby the gavel is carried into the compressor, and the butt-end thereof shaped, and retained while being bound; and in combination of staggered segmental drive-wheel, intermittently-revolving disk-pinions, retaining-latches, gear-wheels, and cam with each other, and with the rotating butting and discharging devices, as hereinafter more fully described and specifically claimed.

To enable others skilled in the art to which it appertains to make and use my invention, I will proceed to describe it with reference to the drawings, in which—

A E E, Fig. 1, represent the main frame of the machine, and to which the machinery of the binder is connected and supported, and it may be attached to and form a part of the otherwise ordinary harvester or mower, the whole being so arranged and combined with other suitable devices as to cause the grain to be deposited automatically in the receiver O, and in gavels of suitable size to form sheaves. This object may be effected in any practicable manner, as the grain may be raked directly from the grain-platform by means of well-known devices for this purpose; or it may be carried by means of endless ribbons to a secondary receptacle above the binder, and allowed to drop into the receiver O when a sufficient quantity has accumulated to form a sheaf. The receiver O is securely connected to the frame $a$ by means of suitable lugs provided for the purpose, and is cylindriform, and provided at the top with an opening for the reception of the gavel, while at the under side is another opening for the discharge of the bound sheaf. The said opening beneath is provided with a sliding door, $O^1$, which is operated in a manner hereinafter described.

Within the cylinder O is a loosely-fitting piston, $b$. The said piston is formed in two parts—the main frame or spider, with the outer convexed rim $b$, and the inner circular convexed disk $p$, which occupies the opening formed within the rim $b$. The said disk $p$ is provided with a short shaft, which turns loosely within the sleeve-bearing $p'$ in the spider $d$. The piston $b$ is retained in position by means of the curved rod $f\ f'$, which is securely connected to the spider $d$ at its curved end $f'$. The straight part $f$ of the said rod works in suitable bearings 9 9′, attached to the frame $a$. Between the bearings 9 9′, and upon the rod $f$, is secured the adjustable stud $d$, which is secured in place by means of a suitable set-screw, and in such a manner as to allow the piston $b$ to be adjusted to different positions within the receiving-cylinder O, so as to suit different lengths of grain, as will be hereafter described.

Motion is communicated to the piston $b$, from the main drive-wheel $y$, by means of the connecting-rod $b$, crank 15, miter-gears $k'$ $k''$, and the intermittent pinion $u$.

The sliding door $O^1$ is held closed by the spiral spring 16, and is provided with a ledge, $u^2$, over which the piston $b$ rises in its forward movement, but catches when moving rearward, carrying the said door $O^1$ back with it, for the purpose of allowing the bound sheaf to fall out of the compressing-ring. The piston having reached the extent of its rearward movement, the ledge $u^1$ raises it from the catch or ledge $u^2$, releasing the door $O^1$, which is then closed by the spiral spring 16.

To the cross-bar $E'$ is secured the swinging head $D$, by means of the pivoted bearing $h$, which is formed in two parts—the journal-box $h$ and the plate or head $n^1$. The head $n^1$ is firmly secured to the frame $E'$, and the journal-box $h$ pivoted to it by means of a stud, $w$, in such a manner as to allow the said journal-box $h$ to swing freely laterally.

The spindle $k$ of the head $D$ is tubular, and within which is placed the shaft $V$, which is arranged to slide longitudinally within the said hollow spindle $k$, which is elongated, to prevent the shaft $V$ from binding within. The end of the shaft $V$ is provided with a sliding or swinging journal-box, $n^5$, within the arc-slides $g$, which are secured to the cross-bar $E$, and have for their purpose to prevent the box $n^5$ from rising out of line with the box $h$. The said slides $g$ are placed so as to correspond radially with the pivot $n^2$ of the arm $F$ on the cross-bar $E'$. The opposite end of the arm $F$ is pivoted to the shaft-box $n^2$, and has for its purpose to govern the movements of the shaft $V$ within the head $D$. The said shaft $V$ is provided with a shoulder and collar for its retention within its bearing $n^5$.

The head $D$ is provided with a series of arms, $b^1$, placed radially about its hub. To the said arms $b^1$ are pivoted the curved arms $s$, the inner or short ends $b^2$ of which radiate internally, and have a common bearing within an annular groove in the head $H$ of the shaft $V$, the longitudinal motion of which governs the motion of the said arms $s$.

The outer ends of the arms $s$ are provided with the curved jaws $t$, which are placed nearly at right angles therewith, so as to permit their ends to pass each other right and left as the arms $s$ close, thus forming, as they converge, a contracting ring. The jaws $t$, or differential ring, are of such curvature as to form a circle when they grasp an average-sized sheaf. The jaws $t$ are closed by means of a coil-spring, 4, upon the shaft $V$, one end of which rests against a pin in the shaft $V$, and the opposite rests against the end of the hollow spindle $k$. A suitable collar upon the spindle $k$ retains it within the swinging journal-box $n$. The block $B$ upon the frame $a$ represents the device which forms the band about the gavel as it is held and revolved by the ring $t$. By this construction, when the head $D$ is swung around in the direction indicated by the arrow, the arm $F$ forces the shaft $V$ through the spindle $k$, depressing the spring 4, and opening the ring $t$, which is at the same time swung around from the binder $B$ a distance just equal to the radial movement of the jaws $t$, or differential ring, thus keeping the side of the ring formed by the said jaws $t$ constantly in the same position relative to the binder $B$, which is a very important object in this class of compressors, rendering the whole device practicable.

It is essential in the construction of harvester-binders of this class, where there are several elements assembled, that a portion only be brought into action at once. To attain this object I use a drive-wheel with a double segmental perimeter, one of the segments of which engages two or more pinions placed at different points within the path of the said segment as the drive-wheel revolves, and in a manner so that the segment will engage with but one pinion at once, turning it one revolution, and then passing to the next, thus rendering it unnecessary to use more than one drive-wheel for a number of intermittent pinions.

In the drawing, $y$ represents the drive-wheel of my machine, and it is hung on the driving-shaft $y^2$, which is provided with bearings in the cross-bars $E$ $E'$. The said drive-shaft $y^2$ is connected with, and receives motion from, some of the slow-moving parts of the harvester or mower, and in such a manner as to be caused to turn one revolution, and then be stopped automatically by means of a clutch or other suitable device. The pinion $v$ is hung on a short shaft supported within a long bearing, 17, attached to the cross-bar $E'$. On the opposite end of the shaft of the pinion $v$ is hung the gear-wheel $J$, which meshes with the toothed head $D$. The toothed part of the head $D$ is, or should be, rounded, and the gear-wheel $J$ should be correspondingly concaved, and both formed with wide faces, so as to allow the head $D$ to swing about the pivot $w$, as before described, without throwing the said gears out of mesh.

$O^2$ is a latch, pivoted to the frame $a$, and held against the disk $v'$ of the pinion $v$ by means of a coiled spring. (Not shown in the drawing.) The disk $v'$ is scalloped on one side, corresponding with the path of the pins 7 and 8 on the drive-wheel $y$, and provided with a corresponding notch, which engages a stud on the latch $O^2$, for the purpose of retaining the pinion $v$ in position when not engaged by its drive-wheel segment, which has twice as many teeth as the pinion $v$; hence the said pinion turns two revolutions during the passage of the segment. By varying the circumference and number of teeth relatively in the wheel $J$ and head $D$, the said head can be made to turn any number and parts of revolutions that may be desired for the formation of the band. The pins 7 and 8 impinge against and raise the latch $O^2$ out of the notch in the disk $v'$ when the drive-segment is about to engage the pinion $v$, and, passing the scalloped part of the said disk $v'$, insure the proper engagement of the said pinion and segment, also insuring the pinion coming to the proper position for the latch $O^2$ to enter its notch as the segment leaves the said pinion. $n$ is a similar pinion, hung on the end of a short shaft supported within the long bearing 14, attached to the cross-bar E. On the opposite end of the said shaft is secured the cam C, which has for its purpose to open the compressing-ring by impinging against the pin $p^4$ in the slide $k^7$, which is suitably provided with the bearings 12 12, and connected, by means of the connecting-rod 22, to the sliding journal-box $n^5$. The pinion $n$ is constructed and operates somewhat similar to the pinion $v$, except that it is provided with a double disk, and with one more tooth than its corresponding segment on the drive-wheel, the manner of operation of which will be hereinafter described. The shaft $l$ is hung in suitable bearings attached to the under side of the cross-bars E E', and it carries the pinion $u$, rigidly connected therewith. The said pinion meshes with the same segment of the drive-wheel as does the pinion $n$, and it is provided with a disk and spring-latch similar to the pinion $v$. Its latch $u^4$, however, is attached to the cross-bar E. The said pinion $u$ has the same number of teeth as has the drive-segment with which it meshes, and it is placed a distance circumferentially from the pinion $n$ equal to the length of the before-mentioned segment, with which it meshes; hence it makes one complete revolution on the passage of the segment, which is just leaving the pinion $n$, when it engages the said pinion $u$. To the forward end of the shaft $l$ is attached the miter-wheel $k''$, which meshes with a similar miter, $k'$, which is provided with a sleeve, which turns on a stud firmly connected to the frame $a$. To the hub of the miter-wheel $k'$ is secured the crank 15, which is, by means of the connecting-rod $b$, connected with and communicates motion to the rod $f$ and piston $b$, as hereinbefore described.

The operations of my machine are substantially as follows: Supposing the sliding door $O^1$ be closed, the pinion $u$ will then have made one-half of a revolution, and the compressor be open and in the position shown in Fig. 1, in which position the binder is supposed to stand when out of gear with the harvester. We will now conceive a gavel of grain deposited in the receiver O, with the heads thereof next the ring $t$; the drive-wheel $y$ is thrown into gear with the harvester, causing the pinion $u$ to complete its revolution, which causes the crank 15 to move to its opposite center, and, by means of the rods $b f$, carries the piston $b$ to the position shown in Fig. 1, pushing the gavel into the ring $t$. The short segment of the drive-wheel will now have passed the pinion $u$, and the latch $u^4$ will have dropped into its retaining-notch in the said pinion. The pin 6 in the drive-wheel $y$ will impinge against and withdraw the latch 5 from the notch in the circle 24, and strike against the secondary disk 9, causing it with the pinion to revolve a short distance, carrying the end of the cam C past the pin $h^4$ on the slide $k^7$, thus releasing the said slide with the rear end of the shaft V. The spring 4 now draws the shaft V through the spindle of the head D, the head H acting upon the short ends $b^2$ of the arms $s$, thus closing the jaws or ring $t$ upon the gavel. The whole compressor is at the same time, by means of the arm F, swung around, bringing the gavel to proper shape, and against the band-former B, in the manner hereinbefore partially described. The gavel having now been condensed and confined within the ring $t$, the butt-end thereof rests against the convexed disk $p$, which offers no resistance to its revolution, as the said disk revolves freely with it, keeping the butts of the straws straight and even. The latch 5 having entered a second notch in the circle 24, the pinion $n$ is thus retained in position. The pin 8 now releases the latch $O^2$ from the pinion $v$, and the longer segment of the driver engages it, and, through the wheel J and head D and connections, revolves the gavel in contact with the binder B. We will conceive the band to be formed about the gavel by means of any suitable device occupying the place of the block B, the ends of the band being fastened, and the sheaf assumed to be properly bound; the long segment will have passed the pinion $v$, which is secured by the latch $O^2$.

The curved pin now raises the latch 5 from the notch in the circle 24, and the short segment engages the pinion $n$, the arm 19 passing around the upper horn of the disk $m$, and along the scalloped part of the secondary disk 9, thus insuring the proper engagement of the said pinion and segment, the pinion $n$ and the cam C having made one revolution, thereby carrying the end of the shaft V to the position shown in Fig. 1, throwing open the compressor-ring $t$, the latch 5 engaging a notch in the circle 24, thus retaining the compressor in the position shown. The short segment, on leaving the pinion $n$, engages the pinion $u$, as before described, causing it to revolve one-half of a revolution, thereby carrying the crank 15 to the opposite center, and the piston $b$ to the forward end of the receptacle O, and carrying with it, as before described, the sliding door $O^1$, and allowing the bound sheaf to drop out of the clamping-ring $t$. The door $O^1$ being closed by means of the coil-spring 16, in the manner hereinbefore described, the driver $y$ may then be thrown out of gear until another gavel is ready for binding, when the whole operation may be repeated.

It will be seen that, by the arrangement of the pinions and spring-latches herein shown, those parts of the machine which are at rest are securely retained in position, while they add nothing to the friction of the moving parts. The head D and its connections are relieved from all strain upon their bearings, caused by the spring 4, when there is a gavel in the compressing-ring, causing it to revolve without any considerable resistance.

Having thus described my invention, what I claim as new, and desire to secure by Letters Patent, is—

1. In a grain-binder, the herein-described holding-head, consisting of swinging toothed head D, arms s F, segmental overlapping jaws t, shaft V, and the spring 4, combined substantially as and for the purposes herein specified.

2. The combination of the holding-ring t, receiver O, piston b, and the driving-gear u k' f, substantially as and for the purposes herein specified.

3. In a grain-binder, the staggered segmental drive-wheel y, compressor-gear n, and the gavel-rotating gear v, these members all constructed and arranged to operate in combination, substantially in the manner and for the purpose herein specified.

4. The combination of the swinging head-box $n^5$, cam C, pinion n, spring-latch 5, and the drive-wheel y, substantially as and for the purposes herein specified.

5. The combination of the head D, gear J, pinion v, latch $O^2$, and the segmental drive-wheel y, substantially as and for the purposes set forth.

6. The combination of the receiver O, piston b, door $O^1$, and the spring 16, substantially as and for the purposes set forth.

7. In combination with the open piston b, the convexed revolving disk p, substantially as and for the purposes herein specified.

8. In a grain-binder, the combination of the compressor-gear n and the butting and discharging gear u, all mounted within the path of a single segment of the revolving segmental driving-wheel y, whereby the former are each alternately engaged and operated by the latter, substantially in the manner and for the purposes herein specified.

HARRY H. BRIDENTHALL, JR.

Witnesses:
PHILIP McGUIRE,
JOHN McGUIRE.